United States Patent
Nagara (10) Patent No.: US 6,842,469 B2
(45) Date of Patent: Jan. 11, 2005

(54) LASER DRIVING METHOD AND DEVICE, AND RECORDING/REPRODUCING DEVICE AND METHOD

(75) Inventor: Toru Nagara, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/084,985

(22) Filed: Feb. 28, 2002

(65) Prior Publication Data

US 2002/0131358 A1 Sep. 19, 2002

(30) Foreign Application Priority Data

Mar. 1, 2001 (JP) ........................................ 2001-057248

(51) Int. Cl.⁷ ................................................ H01S 3/00
(52) U.S. Cl. ................................ 372/38.02; 372/29.01
(58) Field of Search ............................ 372/37–39, 25, 372/26

(56) References Cited

U.S. PATENT DOCUMENTS

| | | | | |
|---|---|---|---|---|
| 4,685,097 A | * | 8/1987 | van der Put | 369/53.26 |
| 4,747,091 A | * | 5/1988 | Doi | 369/116 |
| 4,975,358 A | * | 12/1990 | Sonnenschein et al. | 430/270.14 |
| 5,237,558 A | * | 8/1993 | Horikiri et al. | 369/53.26 |
| 5,377,213 A | * | 12/1994 | Honda | 372/29.015 |
| 5,438,581 A | * | 8/1995 | Reele | 372/38.02 |
| 5,477,557 A | * | 12/1995 | Inaba et al. | 372/38.02 |
| 5,508,986 A | * | 4/1996 | Kagamibashi et al. | 369/53.37 |
| 5,532,991 A | * | 7/1996 | Sasaki | 369/44.35 |
| 5,612,939 A | * | 3/1997 | Ueki et al. | 369/47.11 |
| 5,705,877 A | * | 1/1998 | Shimada | 310/318 |
| 5,859,862 A | * | 1/1999 | Hikasa et al. | 372/38.02 |
| 5,884,122 A | * | 3/1999 | Kawabuchi et al. | 399/88 |
| 6,118,798 A | * | 9/2000 | Ema et al. | 372/29.011 |
| 6,128,040 A | * | 10/2000 | Shinbori et al. | 348/372 |
| 6,292,284 B1 | * | 9/2001 | Takauji et al. | 398/197 |
| 6,466,595 B2 | * | 10/2002 | Asano | 372/29.021 |
| 6,606,286 B1 | * | 8/2003 | Maekawa | 369/47.17 |

* cited by examiner

Primary Examiner—Minsun Oh Harvey
Assistant Examiner—Tuan N. Nguyen
(74) Attorney, Agent, or Firm—Frommer Lawrence & Haug LLP; William S. Frommer; Darren M. Simon (57) ABSTRACT

In a power supply circuit, a first power-supply voltage supplied to a laser driving circuit for driving a short-wavelength semiconductor laser of an optical pickup is made higher than a second power-supply voltage supplied to circuits except the laser driving circuit, for example, a reproducing system, a servo system and a recording system. Thus, the power consumption in a device for driving a short-wavelength semiconductor laser such as an InGaN-based semiconductor laser is reduced.

8 Claims, 6 Drawing Sheets

LASER DRIVING METHOD AND DEVICE, AND RECORDING/REPRODUCING DEVICE AND METHOD

BACKGROUND OF THE INVENTION

1. Field of the Invention

This invention relates to a laser driving method and device for driving a light source of a laser beam for carrying out recording to and/or reproduction from a recording medium such as an optical disc, and a recording/reproducing device and method. Particularly, it relates to a laser driving method and device for driving a violet short-wavelength semiconductor laser such as a GaN-based or InGaN-based semiconductor laser, and a recording/reproducing device and method.

2. Description of the Related Art

Recently, there has been a significant progress in the technique for increasing the density of a recording medium. For example, in order to increase the density of an optical disc, it is basically conceivable to increase the numerical aperture (NA) of the optical system or shorten the wavelength of the light source.

When shortening the wavelength of the light source, if a semiconductor laser (laser diode (LD)) is used as the light source and the wavelength of its laser beam is shortened, a band gap necessary for semiconductor laser emission is increased and therefore the operating voltage of the semiconductor laser is increased (raised). Particularly, with a wavelength of approximately 400 nm as in a violet laser, the laser cannot be driven by a power-supply voltage of 5 V, which is generally used for a circuit power supply.

Meanwhile, in an equipment using such a violet semiconductor laser, increase in the power-supply voltage of the circuit causes increase in the power consumption and enormous increase in the calorific value, making it difficult to design the equipment. In the case of a short-wavelength semiconductor laser with a wavelength of approximately 400 nm, large variance in the operating current is observed from the beginning to the end of the operating life. Particularly, in the case of a GaN-based semiconductor laser, it is known that the operating current at the end of the life varies approximately 1.5 times greater than at the beginning. If a high circuit power-supply voltage is set in consideration of this aspect, the power consumption and the calorific value are increased further.

In view of the foregoing status of the art, it is an object of the present invention to provide a laser driving method and device and a recording/reproducing device and method which enable reduction in the power consumption and prevention of difficulty in the circuit design.

SUMMARY OF THE INVENTION

In a laser driving method and device according to the present invention, a first power-supply voltage supplied to a laser driving circuit for driving a laser light source for emission is made higher than a second power-supply voltage supplied to circuits except the laser driving circuit.

Moreover, in a recording/reproducing device and method according to the present invention, when casting a laser beam from a laser light source onto a recording medium to carry out recording and/or reproduction, a first power-supply voltage supplied to a laser driving circuit for driving the laser light source for emission is made higher than a second power-supply voltage supplied to circuits except the laser driving circuit.

As the laser light source, a short-wavelength semiconductor laser with a violet laser beam is used. It is preferred to detect the operating voltage of the laser light source and control the first power-supply voltage on the basis of the detected operating voltage. Specifically, the first power-supply voltage is controlled to a voltage obtained by adding the operating voltage to a voltage necessary for the laser driving circuit. As the operating voltage, the operating voltage of the laser light source detected in writing and/or reading may be used.

Moreover, when turning on the power or when inserting the recording medium, the first power-supply voltage is initially set on the basis of the maximum or minimum operating voltage of the laser light source or the previously determined operating voltage, and is controlled on the basis of the operating voltage of the laser light source detected in writing and/or reading.

Furthermore, when the laser light source does not operate, the supply of the first power-supply voltage is stopped.

By supplying, only to the driving stage for driving the short-wavelength semiconductor laser with a violet laser beam, the first power-supply voltage which is higher than the second power-supply voltage supplied to the other circuits, the power consumption is reduced and the respective circuit designs are optimized.

DESCRIPTION OF THE PREFERRED EMBODIMENTS

Preferred embodiments of the laser driving method and device and the recording/reproducing device and method according to the present invention will now be described with reference to the drawings.

Figure 1:
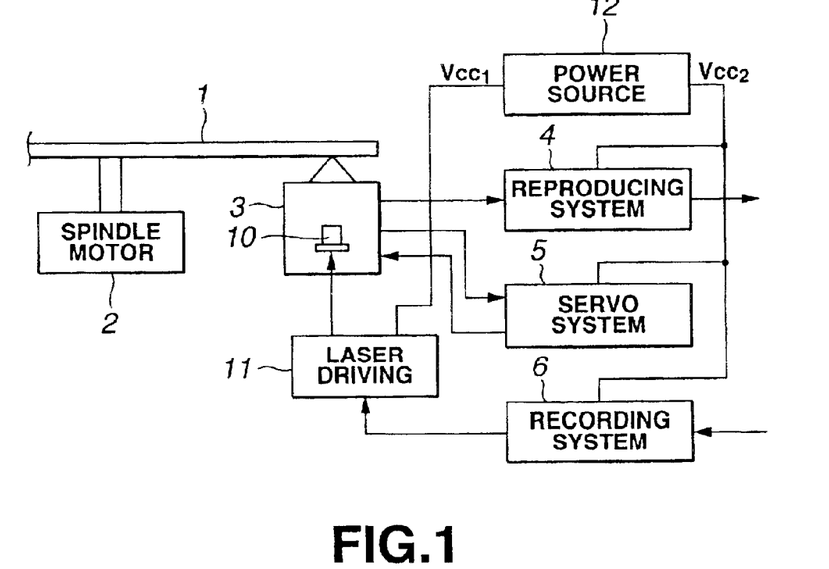
FIG. 1 is a block diagram showing the schematic structure of a disc recording/reproducing device to which a laser driving method and device as an embodiment of the present invention is applied.

FIG. 1 is a block diagram showing an exemplary disc recording/reproducing device for recording and reproducing a signal to and from a recordable disc-shaped recording medium such as a magneto-optical disc. A laser driving method and device as a first embodiment of the present invention is applied to this disc recording/reproducing device.

In FIG. 1, a recordable medium such as a magneto-optical disc is used as a disc-shaped recording medium 1, and this disc-shaped recording medium 1 is rotationally driven by a spindle motor 2. An optical pickup 3 for carrying out recording to and reproduction from the disc-shaped recording medium 1 is provided with a short-wavelength semiconductor laser (laser diode (LD) 10 having a wavelength of 600 nm or less, as a laser light source. In this embodiment, a GaN-based or InGaN-based semiconductor laser for emitting a violet laser beam is used as the semiconductor laser 10. This GaN-based or InGaN-based semiconductor laser has a short wavelength of approximately 400 nm but it has a high operating voltage because of a large band gap necessary for emission.

Although not shown, the optical pickup 3 is provided with an optical system including a lens, a beam splitter and a wave plate, a biaxial actuator for driving an objective lens, a light receiving element for receiving a return light from the disc, a light receiving element for monitoring the laser power, and the like. A signal from the light receiving element is sent to a reproducing system 4 and a servo system 5 via a matrix amplifier and the like. A focusing servo control signal and a tracking servo control signal from the servo system 5 are sent to the biaxial actuator, not shown, of the optical pickup 3. The servo in the servo system 5 also includes spindle servo for rotationally driving the disc at a predetermined velocity and thread servo for moving the optical pickup 3 itself in the radial direction of the disc. A write pulse signal from a recording system 6 is sent to a laser driving circuit 11 and this laser driving circuit 11 drives the semiconductor laser 10 for emission.

In the first embodiment of the present invention, a first power-supply voltage $Vcc_1$ supplied to the laser driving circuit 11 for driving the short-wavelength semiconductor laser (laser diode (LD)) 10 for emission as described above is made higher than a second power-supply voltage $Vcc_2$ supplied to the circuits except the laser driving circuit. That is, a power-supply circuit 12 supplies the second power-supply voltage $Vcc_2$ of approximately 5 V (or 2–3.3 V), which is a normal circuit power-supply voltage, to the reproducing system 4, the servo system 5, the recording system 6 and the like, and supplies the first power-supply voltage $Vcc_1$ of approximately 8–10 V higher than the second power-supply voltage $Vcc_2$ to the laser driving circuit 11. This is because a short-wavelength laser (laser diode (LD)) with a wavelength of approximately 400 nm requires a large band gap for emission and therefore has a high operating voltage.

In order to increase the recording density of the optical disc, it is conceivable to increase the numerical aperture (NA) of the optical system or shorten the wavelength of the light source. If the wavelength of the light source is shortened, the semiconductor laser or the band gap necessary for emission of the semiconductor laser is increased and therefore the operating voltage of the semiconductor laser is increased. Particularly with a wavelength of approximately 400 nm, the semiconductor laser cannot be driven by a power supply of 5 V, which is used as a normal circuit power supply.

In this case, increase in the overall power-supply voltage causes increase in the power consumption. It is not necessary to raise the power-supply voltage for the circuits except the laser driving circuit. Thus, the power consumption can be reduced by supplying different power-supply voltages to the laser driving circuit and to the other circuits and setting the power-supply voltage for the circuits except the laser driving circuit to a normal power-supply voltage (for example 5V).

For example, if the semiconductor laser has a band gap of 3.5 V, a resistance of 25 Ω and a current of 150 mA at the time of operation, the operating voltage of the semiconductor laser is $$3.5+25\times 0.15=7.25 (V)$$

which is larger than 5 V. Thus, instead of operating the entire circuits with a high voltage of 8–10 V, a power-supply voltage of approximately 10 V is supplied only to the driving circuit of the semiconductor laser and a lower power-supply voltage of 5 V is supplied to the other parts, thereby lowering the power consumption.

Figure 2:
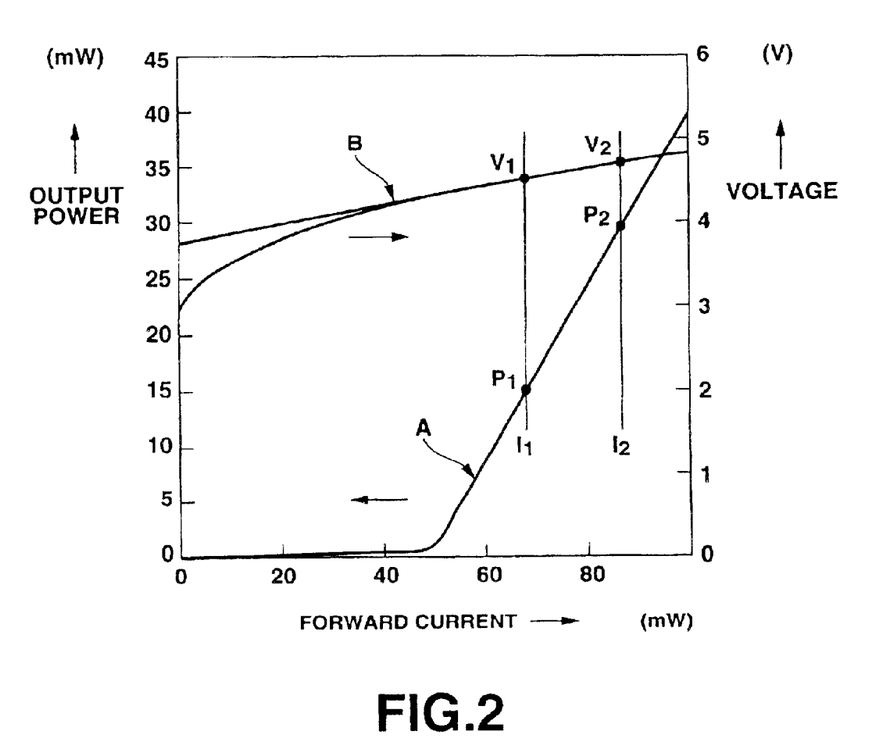
FIG. 2 shows the optical output-current characteristic and the operating voltage-current characteristic of an InGaN-based semiconductor laser (InGaN-LD).

FIG. 2 shows the optical output-current characteristic and the operating voltage-current characteristic of a violet InGaN-based semiconductor laser (InGaN-LD) as an example of the above-described short-wavelength semiconductor laser. A curve A is a characteristic curve representing the output power (mW) with respect to a forward current (mA) and a curve B is a characteristic curve representing the operating voltage (mV) with respect to a forward current (mA). In accordance with the curve A, for example, a current of 80 mA is necessary for obtaining an output of 30 mW and the operating voltage in this case is approximately 4.8 V. Since a voltage (for example, approximately 2 V) applied to the laser driving circuit is added to this operating voltage, a power-supply voltage of 6.8 V or higher is required. Moreover, since the operating voltage is raised with the lapse of time, for example, a power-supply voltage of 8–10 V is required. However, an operating voltage of approximately 8–10 V for the entire circuit parts of the recording and/or reproducing systems and the like leads to increase in the power consumption, which is uneconomical. In the case of a battery-driven electronic equipment, problems arise that the available time of the equipment is shortened and that the calorific value is increased, thus making it difficult to design the equipment.

In consideration of these problems, in this embodiment, only the first power-supply voltage $Vcc_1$ of the semiconductor laser driving stage, specifically, the laser driving circuit 11, is made higher than the second power-supply voltage $Vcc_2$ supplied to the circuits except the laser driving circuit 11.

That is, in the embodiment of the present invention, in the case where a power-supply voltage to be supplied to the laser driving stage is higher than a normal circuit power-supply voltage because of a large band gap as in a GaN-based or InGaN-based semiconductor laser with a wavelength of approximately 400 nm, the first power-supply voltage supplied to the laser driving stage is made higher than the second power-supply voltage supplied to the other circuits.

Thus, the power consumption can be reduced. Moreover, since the laser driving stage (laser driving circuit 11) to which the first power-supply voltage $Vcc_1$ is supplied and the circuits except the laser driving circuit 11 to which the second power-supply voltage $Vcc_2$ is supplied can be separately designed, the respective circuits can be optimally designed.

As a second embodiment of the present invention, it is conceivable to detect the operating voltage of the semiconductor laser and control the power-supply voltage (first power-supply voltage $Vcc_1$) of the semiconductor laser driving stage (laser driving circuit) on the basis of the detected operating voltage.

With respect to the short-wavelength semiconductor laser, particularly, a GaN-based semiconductor laser with a wavelength of approximately 400 nm, the quantity of current varies approximately 1.5 times during its operating life. This is a large difference from an ordinary semiconductor laser with a wavelength of 780–650 nm in which the quantity of current varies approximately 1.2 times. The large variance in the quantity of current leads to large variance in the operating voltage. For example, if the semiconductor laser at the beginning of its operating life has a band gap of 3.5 V, a resistance of 25 Ω and a current of 100 mA, the operating voltage of the semiconductor laser is $$3.5+25\times 0.10=6(V).$$

On the assumption that the current value varies to 1.5 times, the operating voltage at the end of the life of this semiconductor laser is $$3.5+25\times 0.15=7.25(V).$$

In this case, the power-supply voltage of the driving circuit of the semiconductor laser at the beginning of its life may be lower by 1 V or more, than at the end.

Therefore, by detecting the operating voltage of the semiconductor laser and controlling the power-supply voltage of the driving circuit of the semiconductor laser, supply of an unnecessary power-supply voltage can be prevented and the power consumption can be reduced.

As a third embodiment of the present invention, it is conceivable to control the power-supply voltage for the semiconductor laser driving stage, to a voltage obtained by adding a necessary voltage for the semiconductor laser driving stage to the operating voltage of the semiconductor laser.

The necessary voltage to be applied to the driving circuit of the semiconductor laser is substantially constant irrespective of the operating voltage of the semiconductor laser. Therefore, by controlling the power-supply voltage to a voltage obtained by adding a constant voltage to the operating voltage of the semiconductor laser, satisfactory characteristics can be constantly provided. For example, if a voltage of 2 V must be applied to the semiconductor laser driving circuit, and if the semiconductor laser at the beginning of its operating life has a band gap of 3.5 V, a resistance of 25 Ω and a current of 100 mA, as in the above-described example of the semiconductor laser, the operating voltage of the semiconductor laser at the beginning is $$3.5+25\times 0.10=6(V).$$

The power-supply voltage of the laser driving circuit in this case is 8 V, which is obtained by adding the necessary voltage of 2 V for the circuit to the operating voltage of 6 V. The power consumptions of the semiconductor laser and the driving circuit in this case are 0.6 W and 0.2 W, respectively.

The operating voltage at the end of the life is $$3.5+25\times 0.15=7.25(V)$$

with the current value being changed to 1.5 times. The power consumption in this case is approximately 1.1 W for the semiconductor laser and 0.2 W for the driving circuit. If the power-supply voltage of the driving stage is not varied in accordance with the operating voltage of the semiconductor laser, at least a voltage for driving the semiconductor laser to the end of its life is necessary and therefore, the power-supply voltage is 9.25 V or higher.

The power consumption in this case is 0.6 W for the semiconductor laser and 0.33 W for the driving stage at the beginning of the life of the semiconductor laser, and the power consumption is increased to 1.1 W for the semiconductor laser and 0.2 W for the driving stage at the end of the life. Practically, since a higher power-supply voltage must be selected in consideration of the unevenness and margin of the semiconductor laser, the difference in the power consumption is greater than in the above-described calculation.

In the third embodiment of the present invention, by controlling the first power-supply voltage to a voltage obtained by adding a constant voltage required for the laser driving circuit to the operating voltage of the semiconductor laser, satisfactory characteristics can be constantly provided from the beginning to the end of the operating life while restraining the supply of an unnecessary power-supply voltage.

Figure 3:
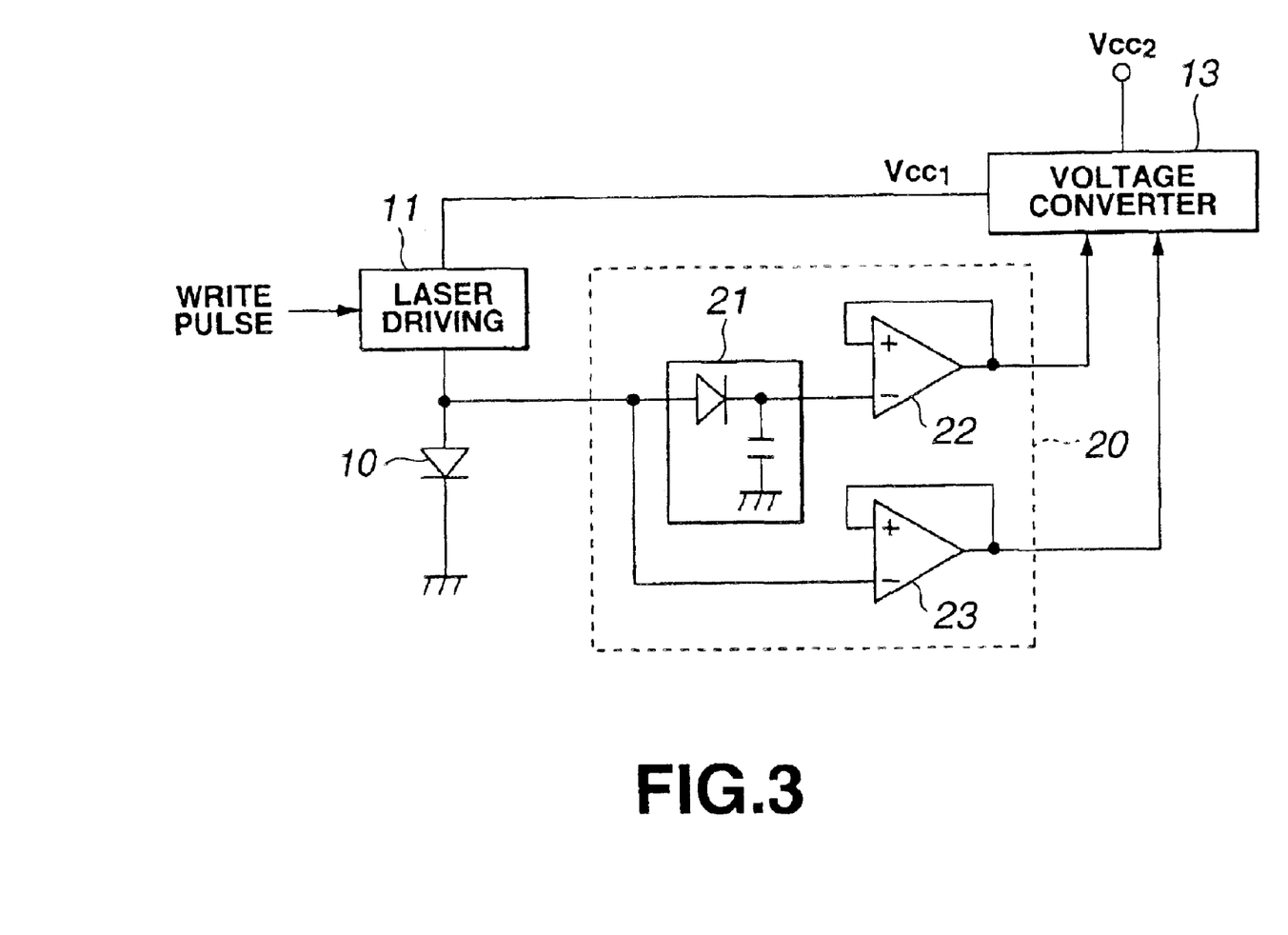
FIG. 3 is a block circuit diagram showing the schematic structure of a laser driving device as second and third embodiments of the present invention.

The second and third embodiments can be realized by, for example, a structure as shown in FIG. 3. In FIG. 3, a laser driving circuit 11 for driving a semiconductor laser 10 for emission is supplied with a first power-supply voltage $Vcc_1$ from a voltage converter 13. This first power-supply voltage $Vcc_1$ is higher than a second power-supply voltage $Vcc_2$ supplied to the circuits except the laser driving circuit 11. As the voltage converter 13, a DC-DC converter for converting the second power-supply voltage $Vcc_2$ to the first power-supply voltage $Vcc_1$ can be used. Moreover, a stabilized power supply circuit may be used which stabilizes the power supply such as a battery and supplies the first power-supply voltage $Vcc_1$ and the second power-supply voltage $Vcc_2$.

An operating voltage detecting circuit 20 detects the operating voltage of the semiconductor laser 10. The detected operating voltage is sent to the voltage converter 13. The voltage converter 13 controls the power-supply voltage (first power-supply voltage $Vcc_1$) of the laser driving circuit 11 on the basis of the detected operating voltage. Specifically, it is conceivable to control the power-supply voltage to a voltage obtained by adding a necessary voltage for the laser driving circuit 11 to the detected operating voltage.

In the example of FIG. 3, a parallel connection circuit including a peak hold circuit 21 and a buffer amplifier 22, and a buffer amplifier 23, is used as the operating voltage detecting circuit 20. The peak hold circuit 21 and the buffer amplifier 22 detect the operating voltage in writing (write) and the buffer amplifier 23 detects the operating voltage in reading (read), though not limited to this structure.

As a fourth embodiment of the present invention, an example of determining the power-supply voltage of the semiconductor laser driving means from the operating voltage in writing and/or reading will now be described. Specifically, three examples may be considered, that is, an example of determining the power-supply voltage of the semiconductor laser driving stage from the operating voltage in writing, an example of determining the power-supply voltage from the operating voltage in reading, and an example of determining the power-supply voltage from the operating voltages in both writing and reading.

First, the example of determining the power-supply voltage of the semiconductor laser driving stage by using the operating voltage in writing will be described.

In the case of a recordable optical disc, the read power is generally greater than the write power. In writing, the semiconductor laser emits light by pulse emission (comb emission waveform). For example, in the case of a magnetic field-modulated MO (magneto-optical) disc, a simple repetition pulse is used as the write pulse. In the case of a phase change disc, DC (direct current) emission or pulse emission with less power is used in erasing and high-power pulse emission is used in writing. Since the operating voltage of the semiconductor laser reaches the highest point at the time of peak power emission on a pulse, it is conceivable to input the operating voltage in writing to the peak hold circuit and decide the power-supply voltage of the semiconductor laser driving stage from the output voltage of the peak hold circuit. In reading, the operating voltage determined in writing is held.

Figure 4A:
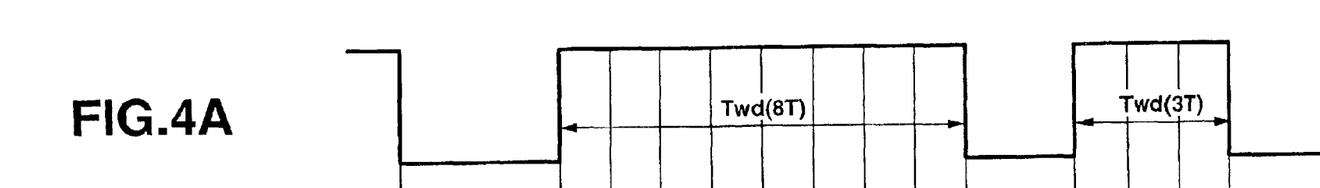
FIG. 4 is a waveform chart showing a specific example of a write pulse B with respect to recording data A on a phase change disc.

FIG. 4 is a waveform chart showing a specific example of a write pulse B with respect to recording data A on a phase change disc. In FIG. 4, the write pulse B has a top pulse Ttop generated a short time after a leading edge of the recording data A, and a multiple pulse Tmp repeated in a channel clock cycle T. These pulses Ttop, Tmp have a level Po. In the write pulse B, a cooling pulse Tcl having a level Pb is arranged immediately after a trailing edge of the recording data A, and the part up to the subsequent leading edge of the recording data A has a level Pe. The respective levels have the relation of Po>Pe>Pb. In FIG. 4A, Twd in the recording data represents the bit length and T represents the channel bit cycle.

Figure 5:
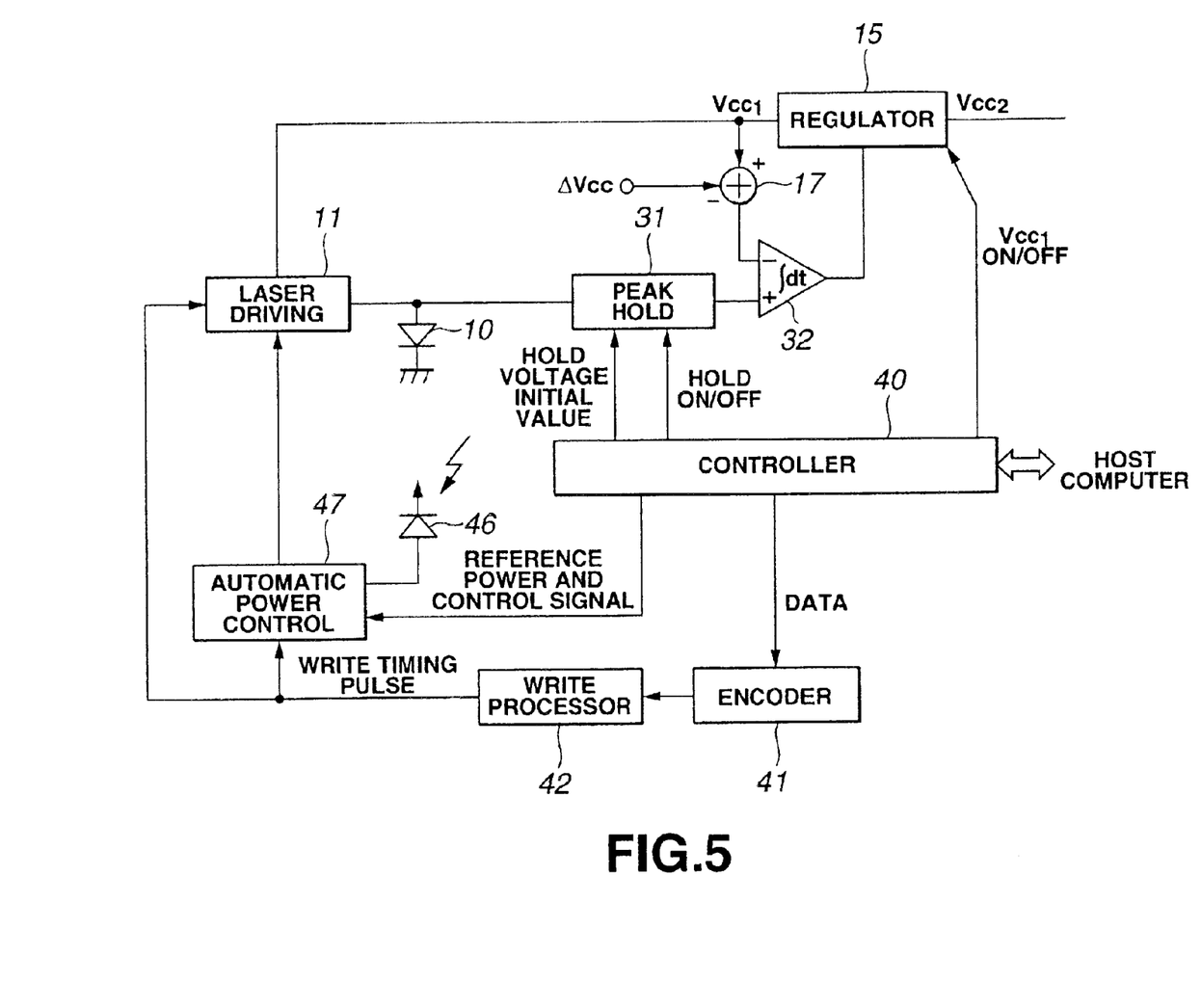
FIG. 5 is a block circuit diagram showing a first specific example of a fourth embodiment of the present invention.

FIG. 5 shows an exemplary structure for determining the power-supply voltage of the semiconductor laser driving stage by using the above-described operating voltage in writing. As a semiconductor laser 10, for example, a violet InGaN-based semiconductor laser is used. This InGaN-based semiconductor laser has a short wavelength of approximately 400 nm but has a high operating voltage because of a large band gap required for emission. A laser driving circuit 11 for driving the semiconductor laser 10 for emission is supplied with a first power-supply voltage $Vcc_1$, for example, from a regulator (stabilized power supply circuit) 15. The first power-supply voltage $Vcc_1$ is higher than a second power-supply voltage $Vcc_2$ supplied to the circuits except the laser driving circuit 11. The connection point between the laser driving circuit 11 and the semiconductor laser 10 is connected to a peak hold circuit 31. The output from the peak hold circuit 31 is sent to the regulator 15 via an integrating circuit 32. In writing, the peak hold circuit 31 holds the peak of the operating voltage of the semiconductor laser 10, and in reading, the peak hold circuit 31 holds the peak level detected in writing and sends it to one end of the integrating circuit 32. If an applied voltage (for example, approximately 2 V) required for the laser driving circuit 11 is represented by $\Delta Vcc$, the voltage $\Delta Vcc$ is subtracted from the first power-supply voltage $Vcc_1$ at a subtracter 17 and the result is supplied to the other end of the integrating circuit 32. The output from the integrating circuit 32 is sent to the regulator. A hold voltage initial value and a hold ON/OFF switching signal are supplied from a controller 40 to the peak hold circuit 31. The regulator 15 decides the first power-supply voltage $Vcc_1$ on the basis of the peak value of the operating voltage in writing. In reading, the operating voltage determined in writing is held.

In the above-described method, the value is found only in writing and the previously found value must be held in reading. Therefore, if the reading time is long, the operating voltage of the semiconductor laser might change during the reading time and the power-supply voltage might become insufficient. Moreover, since the peak hold circuit is necessary in the circuit system, the circuit system is complicated. However, the above-described method is advantageous in that the operating voltage of the semiconductor laser can be accurately determined.

In the specific structure shown in FIG. 5, the controller 40 is connected to a host computer, not shown. In writing, the recording data from the controller 40 is sent to and encoded by an encoder 41, then turned into a write timing pulse by a write processor 42, and sent to the laser driving circuit 11. The emission power of the semiconductor laser 10 is detected by a light receiving element (photodiode or the like) 46 for power monitoring and the detected emission power is sent to an automatic power control (APC) circuit 47, which carries out control to stabilize the emission power. The automatic power control (APC) circuit 47 is supplied with a reference power and a control signal from the controller 40, and is also supplied with the write timing pulse from the write processor 42. Moreover, in the specific example of FIG. 5, in order to stop supplying the first power-supply voltage $Vcc_1$ from the regulator 15 when the semiconductor laser 10 is not used, an ON/OFF control signal is sent from the controller 40 to the regulator 15.

Next, the example of determining the power-supply voltage of the semiconductor laser driving stage from the operating voltage of the semiconductor laser in reading will be described.

The difference between the operating voltages in reading and writing is added to the operating voltage of the semiconductor laser in reading, and the resultant voltage is used as the operating voltage of the semiconductor laser. A power-supply reference voltage is decided from this operating voltage, thus controlling the power-supply voltage. The difference between the operating voltages in reading and writing is provided as a fixed value. In writing, the previously found value is held instead of updating the operating voltage value. This method is advantageous in that the circuit is relatively simple with no peak hold circuit required.

Figure 6:
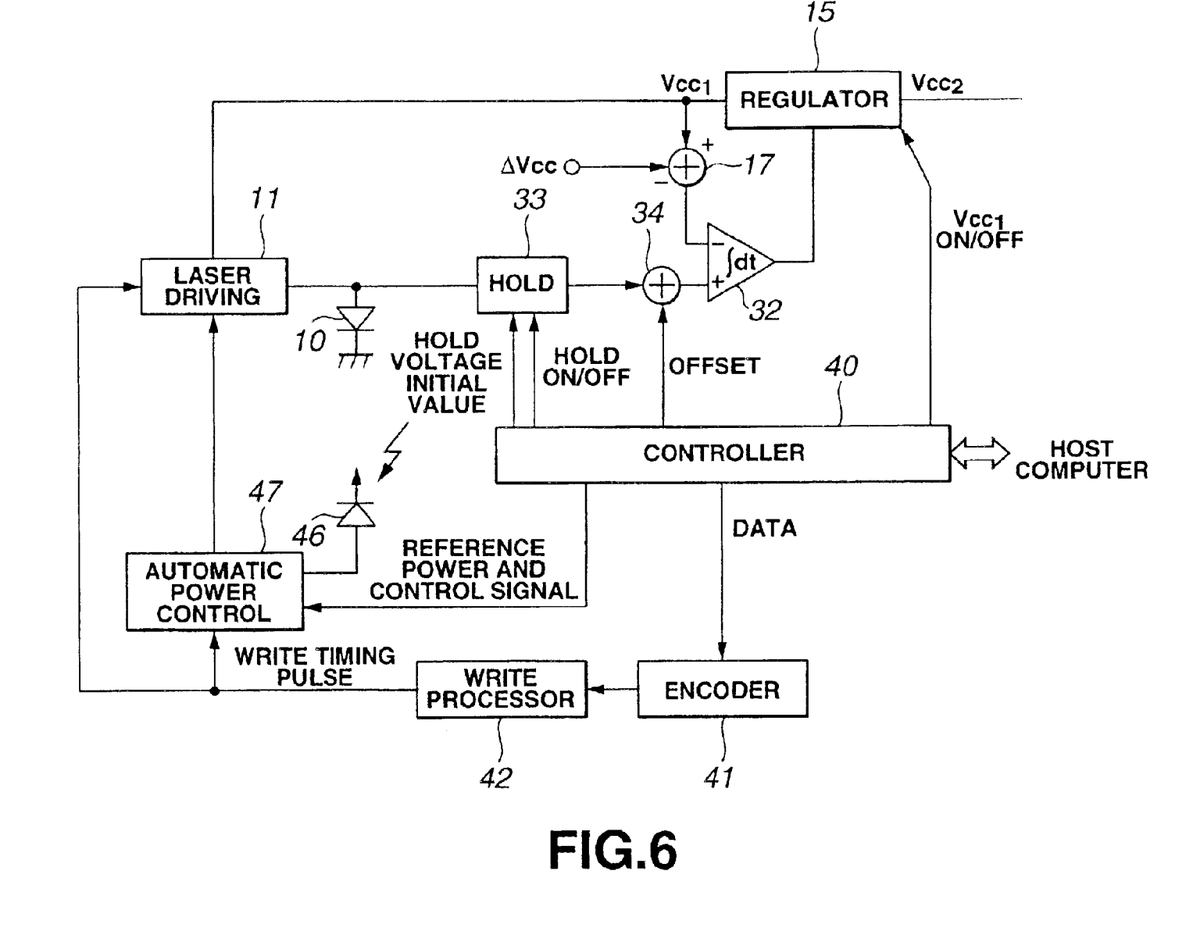
FIG. 6 is a block circuit diagram showing a second specific example of the fourth embodiment of the present invention.

FIG. 6 shows an exemplary circuit structure for determining the first power-supply voltage $Vcc_1$ on the basis of the operating voltage of a semiconductor laser 10 in reading as described above. In the example of FIG. 6, the operating voltage of the semiconductor laser 10 in reading is monitored and sent to an adder 34 via a hold circuit 33. The adder 34 is supplied with the difference between the operating voltages in reading and writing as a fixed offset from a controller 40. In writing, the hold circuit 33 holds the operating voltage in reading and sends it to the adder 34. From the adder 34, a voltage obtained by adding the offset from the controller 40 to the operating voltage in reading is outputted and this addition output is sent to a regulator 15 via one end of an integrating circuit 32. An output from a subtracter 17 which is obtained by subtracting the applied voltage $\Delta Vcc$ of the laser driving circuit from the first power-supply voltage $Vcc_1$ is supplied to the other end of the integrating circuit 32. The controller 40 controls ON/OFF of the hold operation of the hold circuit 33. In writing, the controller 40 sets the hold operation ON to output the operating voltage that was held in reading. The other parts of the structure are similar to those in the example of FIG. 5 and therefore the corresponding parts are denoted by the same reference numerals with no further description.

With respect to the difference between the operating voltages in reading and writing, two cases may be considered: to measure the difference at the time of assembling and provide the difference as a fixed value; and to cause the semiconductor laser to emit light with a plurality of patterns of reading power when the power is turned on, then measure the differential efficiency and resistance of the semiconductor laser, calculate the difference in operating voltage from the differential efficiency and resistance, and provide the difference as a fixed value. In the former case, since it must be anticipated that the difference in operating voltage between reading and writing varies with the lapse of time and the temperature, the resultant operating voltage of the semiconductor laser is necessarily high but the circuit is very simple. In the latter case, an error might be generated because of the calculation and the circuit is large, whereas the variance with the lapse of time and the temperature can be constantly taken into account.

The differential efficiency of the semiconductor laser is expressed by, for example, $$(P_2-P_1)/(I_2-I_1)$$

in FIG. 2, and the resistance of the semiconductor is expressed by, for example, $$(V_2-V_1)/(I_2-I_1)$$

in FIG. 2.

Next, the example of determining the power-supply voltage of the semiconductor laser driving stage from the operating voltages in both writing and reading will be described. In this case, the difference between the operating voltages in reading and writing is added to the operating voltage of the semiconductor laser in reading, and the resultant voltage is used as the operating voltage of the semiconductor laser. A power-supply reference voltage is decided from this operating voltage, thus controlling the power-supply voltage. In reading, the operating voltage is monitored and updated. In writing, the difference between the operating voltages in reading and writing is determined from the peak-held operating voltage in writing. In reading, the difference between the operating voltages in reading and writing is held, and in writing, the operating voltage in reading is held. Although this method requires a complicated circuit, the method is advantageous in that the operating voltage of the semiconductor laser is accurately found and that the operating voltage is constantly found.

Figure 7:
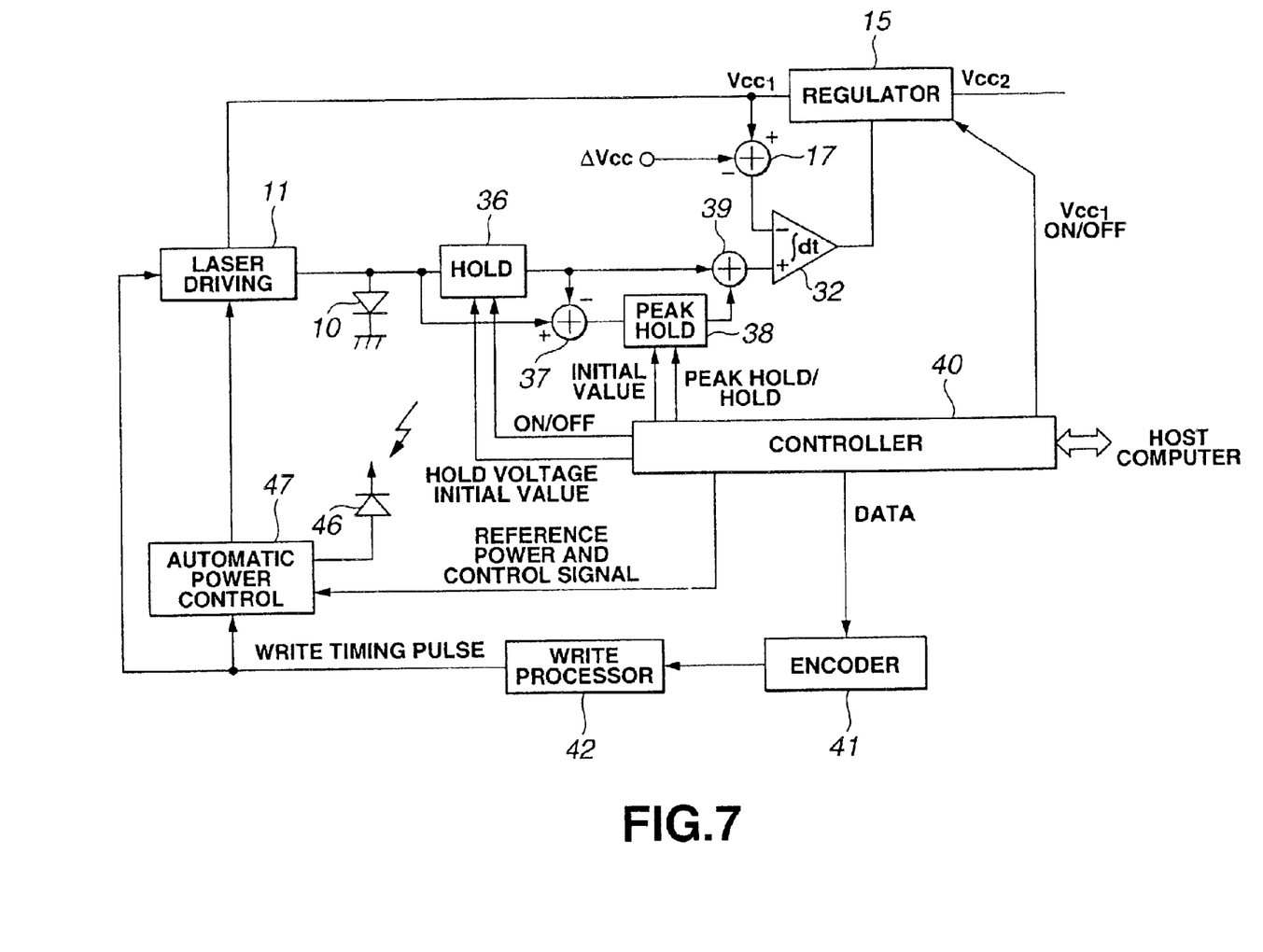
FIG. 7 is a block circuit diagram showing a third specific example of the fourth embodiment of the present invention.

A specific example of the circuit structure in this case will be described with reference to FIG. 7. In the example of FIG. 7, in writing, the operating voltage of a semiconductor laser 10 is held by a hold circuit 36. The operating voltage of the semiconductor laser 10 is subtracted from the output of the hold circuit 36 by a subtracter 37, and the result of subtraction is sent to a peak hold circuit 38. The output from the peak hold circuit 38 and the output from the hold circuit 36 are added by an adder 39, and the result of addition is sent to a regulator 15 via an integrating circuit 32. From a controller 40, a hold ON/OFF switching signal and a hold voltage initial value are supplied to the hold circuit 36, and a peak hold/hold switching signal and a hold voltage initial value are supplied to the peak hold circuit 38. The hold circuit 36 is switched to the hold-ON state in writing, and the peak hold circuit 38 is switch-controlled to the hold side in reading. The other parts of the structure are similar to those in the example of FIG. 5 and therefore the corresponding parts are denoted by the same reference numerals with no further description.

In the example of FIG. 7, in writing, a differential value between the operating voltage of the semiconductor laser 10 and the hold voltage in reading from the hold circuit 36 is found by the subtracter 37, and the difference between the operating voltages in reading and writing is peak-held by the peak hold circuit 38 and then added to the output from the hold circuit 36 by the adder 39. The result of addition is sent to the regulator 15 via one end of the integrating circuit 32. The output from the subtracter 17 (obtained by subtracting the applied voltage Δ Vcc of the laser driving circuit from the first power-supply voltage $Vcc_1$) is supplied to the other end of the integrating circuit 32. In reading, the peak level in writing held by the hold circuit 38 is added to the operating voltage of the semiconductor laser 10 by the adder 39, and the result of addition is sent to the regulator 15 via the integrating circuit 32. Thus, the operating voltage of the semiconductor laser 15 is accurately found and the operating voltage is constantly found.

As a fifth embodiment of the present invention, an example will now be described in which introduction of an initial value to a power-supply voltage control loop and a lead-in method for the loop are considered. As this fifth embodiment, three method may be considered, that is, a method in which the maximum (highest) operating voltage is used as the initial value of the power-supply voltage, a method in which the minimum (lowest) operating voltage is used as the initial value, and a method in which a suitably updated operating voltage is used as the initial value.

In the first method, on the assumption that the operating voltage of the semiconductor laser is at the maximum (highest) when the power is initially turned on or when a disc is inserted, the power-supply voltage of the semiconductor laser driving stage is controlled to be converged to an actual operating voltage value which is lower than the maximum operating voltage. Although this method has a problem of large power consumption at the beginning, the method is advantageous in that the interference between the operation of the APC loop and the operation of the power-supply voltage control loop need not be considered.

In the second method, the power-supply voltage of the semiconductor laser driving stage is set to the minimum (lowest) voltage so that the circuit of the semiconductor laser driving stage at least operates normally with a band gap voltage of the semiconductor laser or a higher voltage when the power is initially turned on or when a disc is inserted. The power-supply voltage of the semiconductor laser driving stage is controlled to be converged to an actual operating voltage which is higher than the minimum value. In this case, the band of the servo loop (APC loop) for controlling the semiconductor laser emission power is set to be higher than the band of the servo loop for controlling the power-supply voltage. This is because when a necessary and sufficient power-supply voltage is not supplied to the circuit, the semiconductor laser driving stage is saturated and a necessary current cannot be supplied, thus causing divergence of the APC loop and maximization of the current-indicating voltage. If, in this state, the power-supply voltage is settled to a predetermined voltage before the response of the APC loop, the saturation of the semiconductor laser driving stage is eliminated and an excessive current flows through the semiconductor laser in accordance with the current-indicating voltage. The advantage of this method is that the power consumption is not large at the beginning.

In the third method, an initial operating voltage is determined by adjustment at the time of shipment from the plant, and in actual use, when the power is initially turned on or when a disc is inserted, the previous operating voltage value is used at the start and all or a part of the write operating voltage, the read operating voltage and the differential voltage between reading and writing is updated in writing/reading. The updated value is written to a storage means (non-volatile memory or the like) such that the data is not erased even when the power is turned off. The updated value thus written will be used the next time the power is initially turned on or the next time a disc is inserted. Although this method requires a storage means, the method is advantageous in that stable characteristics can be provided because of the power-supply voltage constantly having a substantially optimum value.

A sixth embodiment of the present invention will now be described. In this sixth embodiment, the first power-supply voltage $Vcc_1$ is switched between writing and reading so as to realize a minimum necessary voltage. In this case, until the power-supply voltage is stabilized, there is a possibility that an accurate semiconductor laser power will not be outputted (because the saturation as described above) even if the servo loop normally operates. Therefore, a relatively long write/read switching time must be taken in consideration of the stabilizing time of the power-supply voltage.

According to this sixth embodiment, since the first power-supply voltage $Vcc_1$ in reading can be made lower than the first power-supply voltage $Vcc_1$ in writing, it takes only the lowest or minimum power consumption.

A seventh embodiment of the present invention will now be described. In this seventh embodiment, in order to reduce the circuits operating with the first power-supply voltage $Vcc_1$, which is a high voltage, the number of circuits on the driving stage is reduced to less than the number of circuits for controlling a plurality of current quantities.

Figure 4B:
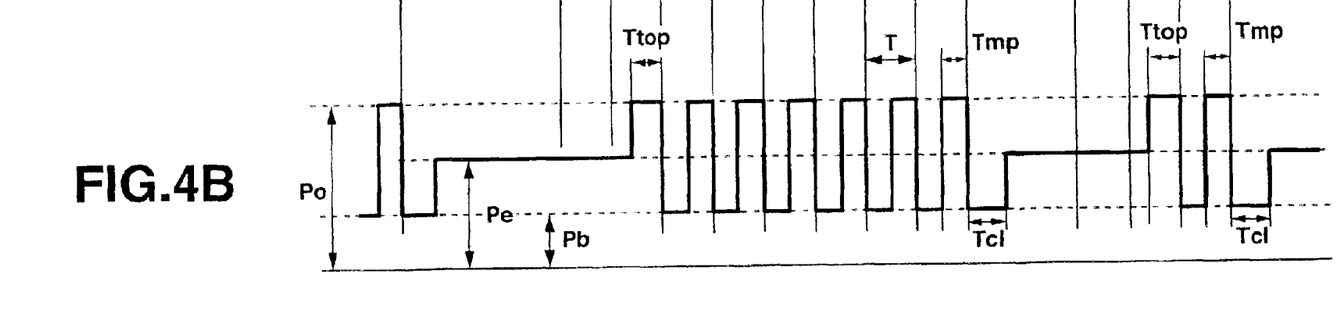

For example, in the case where four values are necessary as the semiconductor laser power, that is, the three levels Po, Pb and Pcl described with reference to FIG. 4B and an erase level Per, not shown, switching signal inputs corresponding to voltages or current inputs indicating the currents of the four values are necessary and circuits for controlling ON/OFF of the currents in accordance with the inputs are required. The circuits for generating these signals need not be operated with the first power-supply voltage $Vcc_1$ and can be operated with a voltage lower than $Vcc_1$. If the outputs of these circuits are connected with the respective circuits on the driving stage, four driving stage circuits are required. Therefore, the circuit area is increased and the power consumption for operating this part with a high voltage is increased.

Thus, in the seventh embodiment of the present invention, the outputs of the switched circuits are grouped in several systems. Specifically, the switching signals corresponding to the voltages or current inputs indicating the currents of the four values are analog-added and the supplied to the laser driving circuit. This enables saving of the circuit area and lowering of the power consumption.

An eighth embodiment of the present invention will now be described. In this eighth embodiment, for power saving, the power supply for the semiconductor laser driving stage is stopped (or turned off) first when not in operation, and the power supply for the other parts is stopped (or turned off) if not in operation for a predetermined time or longer.

In the case of turning the power supply off when the equipment is not in use, if the entire power supply for the APC and the semiconductor laser driving circuit is turned off when no insertion of a disc or no recording/reproduction is carried out for a short time, the value stored in the register is eliminated and therefore needs to be reset, and many other problems arise. Thus, in the eighth embodiment, the part which requires the largest power consumption is the semiconductor laser driving stage, and considering that there is no adverse effect of turning off the power supply (the above-described first power-supply voltage $Vcc_1$) for this part, such as loss of data in the memory, the power-supply voltage (first power-supply voltage $Vcc_1$) for the semiconductor laser driving stage is turned off also when the semiconductor laser is turned out for a short time. Thus, the power consumption can be reduced and the restoration from the power-saving standby state is made quickly.

A ninth embodiment of the present invention will now be described. In this ninth embodiment, outputs for driving a plurality of semiconductor lasers are provided on a single integrated circuit (IC). If at least one of them is operated with a different power supply, when no current flows through the semiconductor laser driven by the driving stage connected to the different power supply, that semiconductor laser power supply is kept off even though a current flows through the other semiconductor lasers.

Specifically, there has been recently presented an optical disc drive which has high-output semiconductor lasers with a plurality of wavelengths and thus supports writing in conformity with a plurality of standards such as CD-R and DVD-R. For example, when preparing a semiconductor laser driving circuit which has a violet semiconductor laser and a red or near infrared semiconductor laser and thus supports optical discs of a plurality of formats, it is preferred to drive all the semiconductor lasers by using the same integrated circuit. The semiconductor lasers except the violet semiconductor laser can be satisfactorily driven with a power-supply voltage of approximately 5 V, which is used for an ordinary circuit power supply. Therefore, when the violet semiconductor laser is not driven as in the ninth embodiment, the power consumption can be reduced by turning off the power supply (the above-described first power-supply voltage $Vcc_1$) for the laser driving stage of the violet semiconductor laser.

In the above-described embodiments, it is possible to decide a reference voltage value for controlling the first power-supply voltage $Vcc_1$ to be supplied to the laser driving circuit, when the power is turned on or when a disc is inserted, and keep the value fixed during the subsequent use. This takes into account that the operating voltage of the semiconductor laser does not vary in a short time.

However, in the case of an equipment which is used with its power kept on for a long period of time such as a server used for the so-called Internet or LAN, or in the case of an equipment such that its operating environment easily varies, it is preferred to constantly monitor the operating voltage and the like and update the reference voltage during the operation.

The present invention is not limited to the above-described embodiments. For example, while the above-described embodiments employ a laser driving method and device in a device for carrying out recording to or reproduction from an optical disc, the present invention can be applied to a laser driving method and device in various devices which use a short-wavelength semiconductor laser of approximately 400 nm. Moreover, while the above-described embodiments use a GaN-based violet semiconductor laser as a laser light source, the present invention can also be applied to the case where a laser light source having a large band gap and having a higher a power-supply voltage to be supplied to the laser driving stage than an ordinary circuit power-supply voltage to the other circuits. Various other modifications can be made without departing from the scope of the present invention.

In the laser driving method and device according to the present invention, a first power-supply voltage supplied to a laser driving circuit for driving a laser light source for emission is made higher than a second power-supply voltage supplied to circuits except the laser driving circuit. Thus, the power consumption can be reduced and the circuit designs of the laser driving circuit and the other circuits can be optimized.

In the recording/reproducing device and method according to the present invention, when casting a laser beam from a laser light source onto a recording medium to carry out recording and/or reproduction, a first power-supply voltage supplied to a laser driving circuit for driving the laser light source for emission is made higher than a second power-supply voltage supplied to circuits except the laser driving circuit. Thus, the power consumption can be reduced and the circuit designs of the respective circuit can be optimized.

It is preferred to detect the operating voltage of the laser light source and control the first power-supply voltage on the basis of the detected operating voltage. Specifically, the first power-supply voltage is controlled to a voltage obtained by adding the operating voltage to a voltage necessary for the laser driving circuit. Thus, even in the case where the operating voltage largely varies from the beginning to the end of the operating life as in a GaN-based semiconductor laser with a wavelength of approximately 400 nm, the supply of an unnecessary power-supply voltage can be prevented and satisfactory characteristics can be constantly provided from the beginning to the end of the operating life.

Moreover, when turning on the power or when inserting a medium, the first power-supply voltage is initially set on the basis of the maximum or minimum operating voltage of the laser light source or the previously determined operating voltage, and is controlled on the basis of the operating voltage of the laser light source detected in writing and/or reading. In the case of initially setting the first power-supply voltage on the basis of the maximum operating voltage, the interference between the operation of the APC loop and the operation of the power-supply voltage control loop need not considered. In the case of initially setting the first power-supply voltage on the basis of the minimum operating voltage, small initial power consumption may suffice. In the case of initially setting the first power-supply voltage on the basis of the previous operating voltage value, a power-supply voltage having a substantially optimum value can be provided and the characteristics are stabilized.

Furthermore, by stopping the supply of the first power-supply voltage when the laser light source does not operate, power saving can be realized while the troublesome operation of resetting in the case of turning off the power supply for the entire circuits is prevented.

What is claimed is:

1. A laser driving device for driving a semiconductor laser, comprising:

an operating voltage detecting circuit connected to said semiconductor laser for detecting an operating voltage of the semiconductor laser;

a voltage converter connected to said operating voltage detecting circuit for converting an input second voltage input from an external power supply into a first voltage greater than the input second voltage on the basis of the detected operating voltage; the input second voltage being the only externally supplied voltage to the laser driving device;

control means for generating control signals to control the laser driving device; the control means being powered by the input second voltage; and a laser driving circuit connected to said voltage converter, said semiconductor laser, and said control means for driving the semiconductor laser on the basis of the first voltage from the voltage converter and the control signals from said control means;

said operating voltage detecting circuit including a hold circuit for detecting and holding an operating voltage of the semiconductor laser on the basis of a hold control signal and a hold voltage initial value; and wherein the voltage converter adjusts the first voltage converted from the input second voltage on the basis of the held operating voltage.

2. The laser driving device according to claim 1, wherein the semiconductor laser emits a short-wavelength violet laser beam.

3. The laser driving device according to claim 1, wherein the second voltage is 5V and the first voltage is between 8V and 10V.

4. The laser driving device according to claim 1, wherein the control means includes:

an emission power detector for detecting an emission power from the semiconductor laser;

a controller for generating a reference power and control signal and a data signal;

an encoder and write processor for generating a write timing pulse on the basis of the data signal; and an automatic power control circuit for generating a power control signal on the basis of the detected emission power, the reference power and control signal, and the write timing pulse;

the semiconductor laser being controlled on the basis of the second voltage, the power control signal, and the write timing pulse.

5. A method of driving a semiconductor laser with a laser driving device, comprising the steps of:

detecting an operating voltage of the semiconductor laser using an operating voltage detecting circuit connected to said semiconductor laser;

converting an input second voltage input from an external power supply into a first voltage greater than the input second voltage on the basis of the detected operating voltage using a voltage converter connected to said operating voltage detecting circuit; the input second voltage being the only externally supplied voltage to the laser driving device;

generating control signals for controlling the laser driving device using a controller; the controller being powered by the input second voltage; and driving the semiconductor laser using a laser driving circuit connected to said voltage converter, said semiconductor laser, and said controller on the basis of the first voltage from the voltage converter and the control signals from said controller;

wherein the detecting step includes a step of detecting and holding an operating voltage of the semiconductor laser on the basis of a hold control signal and a hold voltage initial value; and wherein the converting step adjusts the first voltage converted from the input second voltage on the basis of the held operating voltage.

6. The method according to claim 5, wherein the semiconductor laser emits a short-wavelength violet laser beam.

7. The method according to claim 5, wherein the second voltage is 5V and the first voltage is between 8V and 10V.

8. The method according to claim 5, wherein the control signal generating step includes the steps of:

detecting an emission power from the semiconductor laser;

generating a reference power and control signal and a data signal;

an encoder and write processor for generating a write timing pulse on the basis of the data signal;

generating a power control signal on the basis of the detected emission power, the reference power and control signal, and the write timing pulse; and controlling the semiconductor laser on the basis of the second voltage, the power control signal, and the write timing pulse.

* * * * *